United States Patent [19]
Kane

[11] Patent Number: 5,857,053
[45] Date of Patent: Jan. 5, 1999

[54] OPTICAL FIBER FILTER

[75] Inventor: Richard Thomas Kane, Morristown, N.J.

[73] Assignee: Lucent Technologies Inc., Murray Hill, N.J.

[21] Appl. No.: 877,075

[22] Filed: Jun. 17, 1997

[51] Int. Cl.[6] ................................ G02B 6/02; G02B 6/22
[52] U.S. Cl. ............................ 385/127; 385/126; 385/128
[58] Field of Search ..................................... 385/123, 124, 385/125, 126, 127

[56] References Cited

U.S. PATENT DOCUMENTS 5,359,681  10/1994  Jorgenson et al. ...................... 385/127
5,673,354   9/1997  Akasaka et al. ........................ 385/127

*Primary Examiner*—Phan T. H. Palmer
*Attorney, Agent, or Firm*—Mathews, Collins, Shepherd & Gould, P.A.

[57] ABSTRACT

The present applicant has discovered that an optical filter can be made by etching away part of the cladding of a depressed-cladding fiber. The etching produces a section of fiber having a double peak in the index profile. In a low index medium such as air, the remaining cladding portion guides radiation at certain wavelengths. This radiation is extracted from the radiation in the fiber core.

8 Claims, 4 Drawing Sheets

OPTICAL FIBER FILTER

FIELD OF THE INVENTION

The present invention relates to optical fiber devices, and in particular, to an optical fiber filter particularly useful in optical fiber transmission systems.

BACKGROUND OF THE INVENTION

Optical fibers are key components in modern telecommunications systems. An optical fiber is a thin strand of glass capable of transmitting an optical signal containing a large amount of information over long distances. In essence, it is a small diameter waveguide characterized by a core with a first index of refraction surrounded by a cladding having a second (lower) index of refraction. Light rays which impinge upon the fiber core at an angle less than a critical acceptance angle undergo total internal reflection within the core. These rays are guided along the axis of the fiber with minimum attenuation. Typical optical fibers are made of high purity silica with minor concentrations of dopants to control the index of refraction.

Optical fiber filters are highly useful in multiwavelength fiber communications systems. In such systems an optical fiber simultaneously carries many different communications channels in light of respectively different wavelengths. In the use of such systems it is frequently required to add channels onto the fiber and to selectively remove channels from the fiber. Optical filters are frequently used to assist such addition and removal.

While there are a variety of methods for making optical fiber filters, most such methods require especially doped fibers and expensive equipment such as ultraviolet lasers. The most popular technique involves fabricating fibers doped to exhibit ultraviolet light photosensitivity and exposing the fiber at periodic regions along its length to high intensity ultraviolet light. This exposure produces optical index perturbations which, in short periods, can operate as reflective Bragg gratings and, in long periods, can operate as mode conversion filters. There remains a need for simpler, less expensive method for making optical fiber filters.

SUMMARY OF THE INVENTION

The present applicant has discovered that an optical filter can be made by etching away part of the cladding of a depressed-cladding fiber. The etching produces a section of fiber having a double peak in the index profile. In a low index medium such as air, the remaining cladding portion guides radiation at certain wavelengths. This radiation is extracted from the radiation in the fiber core.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and, except for the graphs, are not to scale.

DETAILED DESCRIPTION

Figure 1:
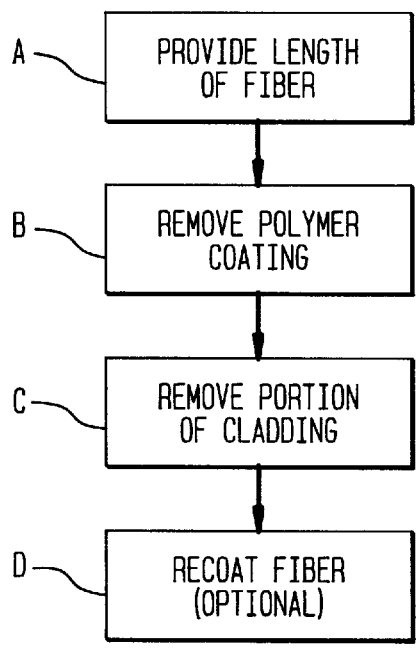
FIG. 1 is a flow diagram showing the steps in making an optical fiber filter in accordance with the invention.

Referring to the drawings, FIG. 1 is a schematic flow diagram of a method for making an optical fiber filter in accordance with the invention. As shown in block A of FIG. 1, the first step is to provide a length of compositely-clad optical fiber.

Figure 2:
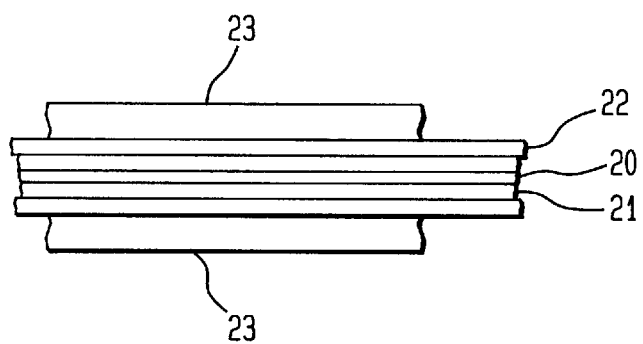
FIG. 2 is a schematic cross section of a typical optical fiber filter useful in the process of FIG. 1.

As better shown in FIG. 2, the fiber should have a core 20 surrounded by at least two different regions of cladding (21,22). The first cladding region 21 adjacent the core has a refractive index lower than the core and the second cladding region 22 adjacent the first region has an index lower than the core but higher than the first region. The fiber is typically made with an outer protective polymeric coating 23.

Figure 3:
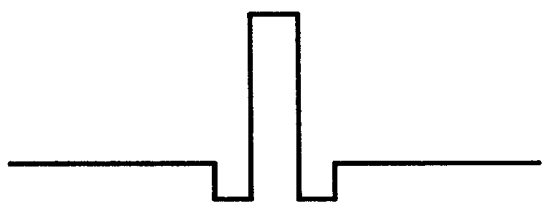
FIG. 3 is a schematic index profile of the fiber of FIG. 2.

FIG. 3 shows the refractive index profile of a typical compositely-clad fiber of the type shown in FIG. 2. Because of the apparent valleys adjacent the core, the fiber is sometimes known as depressed-cladding fiber.

The next step shown in block B of FIG. 1 is to remove the polymer coating 23. Typical polymer coatings can be are removed by mechanical or chemical stripping in accordance with techniques well known in the art.

The third step (block C) is to remove a portion of the cladding as by etching. The objective is to remove sufficient cladding that the remaining portion acts as a cladding waveguide for wavelengths to be filtered from the fiber core. Etching is preferably carried out by dipping in an HF acid solution.

Figure 4:
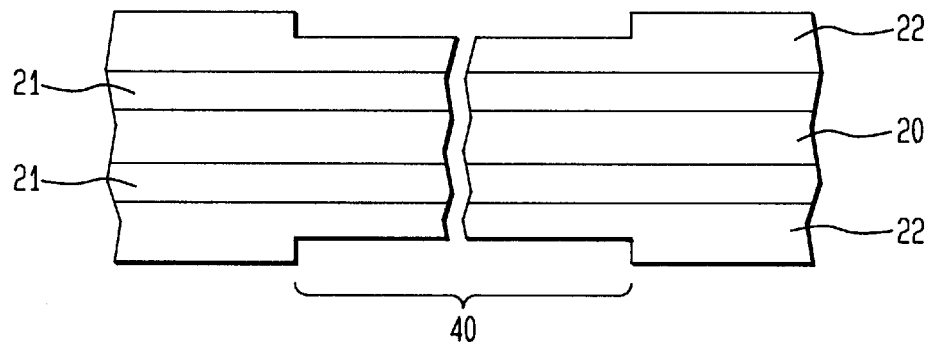
FIG. 4 shows the fiber of FIG. 2 after removal of the polymeric coating and after etching of the outer cladding.

FIG. 4 illustrates the fiber of FIG. 2 after removal of the polymeric coating and after etching a portion of the second cladding region 22 along a length 40.

The final step shown in block D of FIG. 1, is to immerse the reduced thickness portion of the device into a medium, such as a polymer, having a refractive index lower than the second cladding. The second cladding region will then act as a cladding waveguide.

Figure 5:
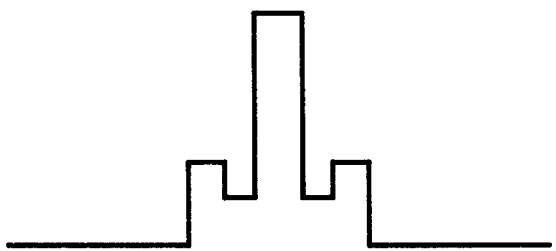
FIG. 5 is an index profile of the fiber of FIG. 4 in the region along the length 40.

FIG. 5 shows the refractive index profile of the FIG. 4 fiber in the region along length 40. As can be seen, the index profile is that of a central core and a concentric ring waveguide radially spaced from the core. Radiation which can be propagated by the outer ring will leak from the core into the outer ring. From the outer ring it will dissipate into the surrounding ambient.

Figure 6:
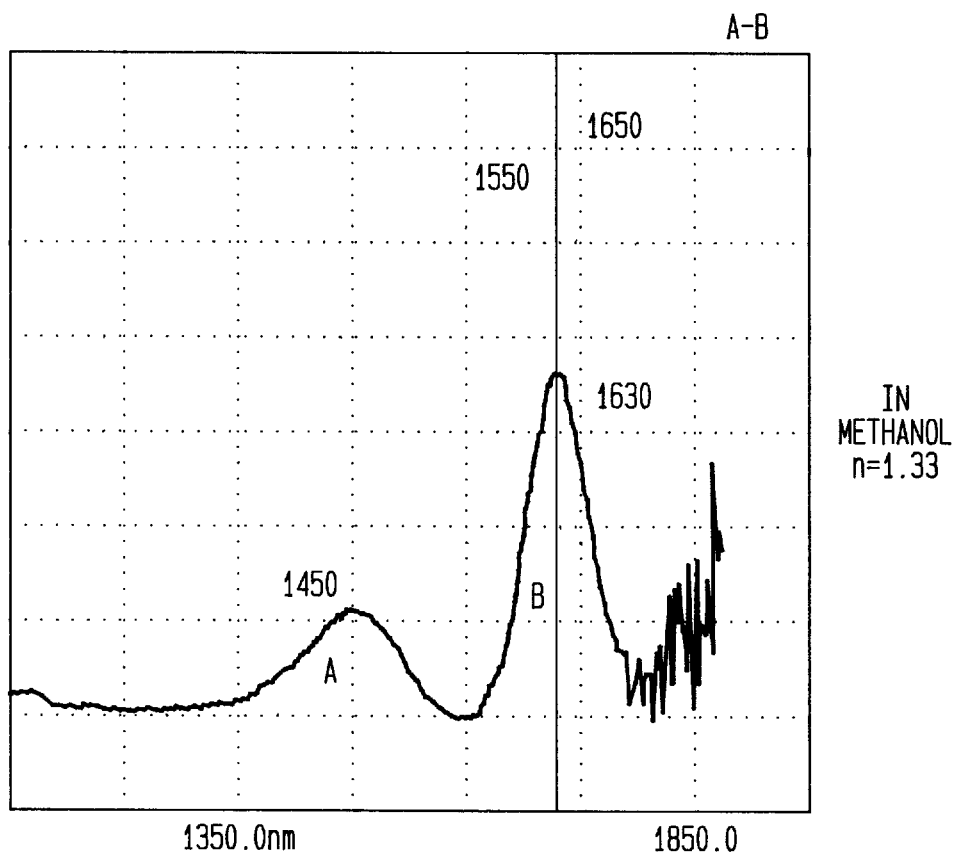
FIG. 6 is a transmission spectrum of the fiber of FIG. 4.

FIG. 6 is a transmission spectrum of a typical filtering device according to FIG. 4. It illustrates transmission through the core when the device is placed in a medium having an index of 1.33 (methanol). As can be seen, the radiation lost is centered around two peak wavelengths designated A and B.

Figure 7:
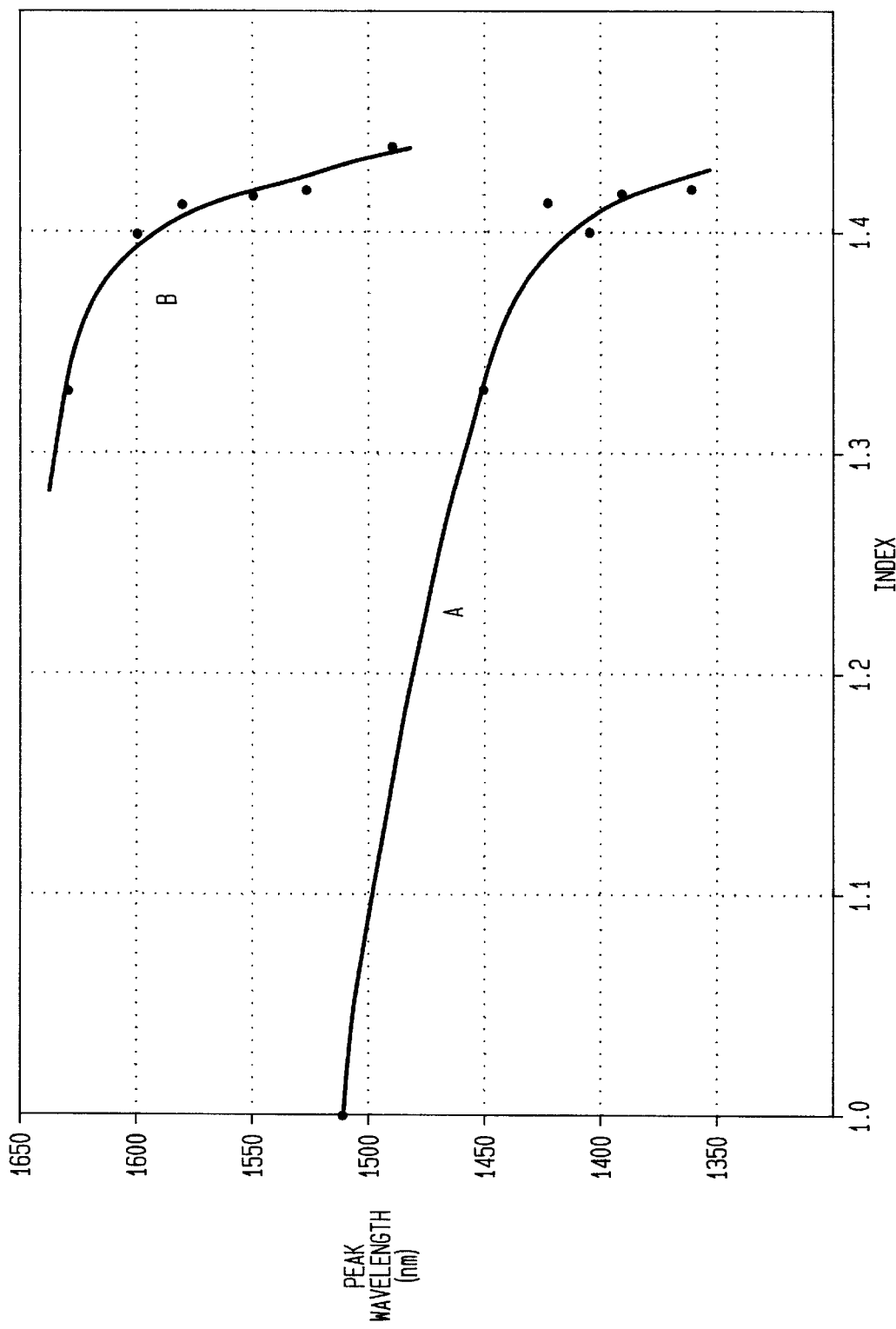
FIG. 7 plots the peak wavelengths for the device immersed in ambients of different refractive index.

FIG. 7 is a graphical illustration useful in designing devices in accordance with the invention. FIG. 7 plots the peak wavelengths A and B as a function of the index of the medium surrounding the device. As can be seen, the higher the index, the lower the peak wavelengths. Thus the peak wavelength can be adjacent by choosing a new protective polymer after etching that has an index appropriate for the desired peak wavelength.

Another method of adjustment of peak wavelength is by bending the device. The greater the bend, the more absorption band is shifted toward longer wavelengths. The preferred method of bending is that described in applicants' co-pending U.S. patent application Ser. No. 08/754,610 filed Nov. 20, 1996 and incorporated herein by reference.

The invention can be better understood by reference to the following specific example.

EXAMPLE

A standard AT&T Depressed Clad fiber (OD 20 $\mu$m, core dia. 8.5 $\mu$m) was looped through a 1 mm inner diameter quartz tube such that a 1.5 inch loop protruded from the tube. The fiber was then lowered into a solution of 48.8% HF with a thin layer (5–7 mm) of laboratory oil deposited on top of the acid solution. During etching, broadband light from a tungsten-halogen source was launched through the fiber, and its transmission characteristics were observed using a spectrum analyzer. The fiber was removed from the etchant after about 30 minutes and exhibited the filtering characterstic shown in FIG.6.

It is to be understood that the above-described embodiments are illustrative of only a few of the many possible specific embodiments which can represent applications of the principles of the invention. Numerous and varied other arrangements can be devised by those skilled in the art without departing from the spirit and scope of the invention.

What is claimed:

1. An optical fiber filter for removing light of a peak wavelength from a fiber core comprising:

a length of optical fiber comprising a core having a first refractive index, a first cladding region adjacent the core having a second refractive index lower than the core and a second cladding region adjacent said first cladding region having a third refractive index lower than the core but higher than the first cladding region, said second cladding region including a length of reduced thickness, the outer surface of said second cladding region in contact with a medium having a refractive index lower than the second cladding whereby said second cladding region acts as a concentric ring waveguide spaced from the core for propagating light of said peak wavelength.

2. An optical fiber filter according to claim 1 wherein said length of optical fiber comprises depressed cladding fiber.

3. An optical fiber filter according to claim 1 wherein said length of reduced thickness is coated with polymer having an index lower than that of the second cladding.

4. An optical fiber filter according to claim 1 wherein said region of reduced thickness is bent to facilitate dissipation of light of said peak wavelength.

5. An optical filter according to claim 1 wherein said medium comprises air.

6. A method for making an optical fiber filter for removing light of a peak wavelength from a fiber core comprising the steps of:

providing a length of optical fiber comprising a core having a first refractive index, a first cladding region adjacent said core having a second refractive index lower than the core and a second cladding region adjacent the first cladding region having a third refractive index lower than the core but higher than the first cladding region, etching away along a length of said fiber a portion of the thickness of said second cladding to produce a length of reduced thickness;

immersing said length of reduced thickness in a medium having a refractive index lower than said second cladding, said second cladding in contact with said medium, whereby said second cladding acts as a concentric ring waveguide spaced from the core for propagating light of said peak wavelength.

7. The method of claim 6 wherein said medium comprises polymer or air.

8. The method of claim 6 further comprises the step of bending length of reduced thickness to facilitate dissipation of light of said peak wavelength.

* * * * *